(12) United States Patent
Chan et al.

(10) Patent No.: US 11,674,817 B2
(45) Date of Patent: Jun. 13, 2023

(54) METHOD FOR RELOCATING A MOBILE VEHICLE IN A SLAM MAP AND MOBILE VEHICLE

(71) Applicants: MICRO-STAR INT'L CO., LTD., New Taipei (TW); MSI COMPUTER (SHENZHEN) CO., LTD., Shenzhen (CN)

(72) Inventors: Hoa-Yu Chan, Taipei (TW); Shih-Che Hung, Taoyuan (TW)

(73) Assignees: MICRO-STAR INTL CO., LTD., New Taipei (TW); MSI COMPUTER (SHENZHEN) CO., LTD., Shenzhen (CN)

( * ) Notice: Subject to any disclaimer, the term of this patent is extended or adjusted under 35 U.S.C. 154(b) by 112 days.

(21) Appl. No.: 17/016,116

(22) Filed: Sep. 9, 2020

(65) Prior Publication Data

US 2021/0348941 A1 Nov. 11, 2021

(30) Foreign Application Priority Data

May 6, 2020 (TW) .................................. 109115019

(51) Int. Cl.
*G01C 21/36* (2006.01)
*G01C 21/20* (2006.01)
(Continued)

(52) U.S. Cl.
CPC ......... *G01C 21/3667* (2013.01); *G01C 21/20* (2013.01); *G01C 21/32* (2013.01); *G05D 1/0212* (2013.01); *G05D 2201/0213* (2013.01)

(58) Field of Classification Search
None
See application file for complete search history.

(56) References Cited

U.S. PATENT DOCUMENTS

2019/0094869 A1* 3/2019 Artes ................... G05D 1/0238
2019/0212730 A1    7/2019 Jones et al.
2021/0278864 A1*  9/2021 Beffa ..................... G05D 1/106

FOREIGN PATENT DOCUMENTS

WO    WO 2020/030966 A1    2/2020

OTHER PUBLICATIONS

Australian Office Action for Australian Application No. 2020230251, dated May 27, 2021.
(Continued)

*Primary Examiner* — Yuen Wong
*Assistant Examiner* — Hongye Liang
(74) *Attorney, Agent, or Firm* — Birch, Stewart, Kolasch & Birch, LLP (57) ABSTRACT

A method for relocating a mobile vehicle in a simultaneous localization and mapping (SLAM) map is provided. The method can be used in the mobile vehicle moving in an area and includes: using SLAM to establish the SLAM map that corresponds to the area at an initial time point; detecting, by a non-SLAM positioning device, a first position trajectory and a first azimuth trajectory of the mobile vehicle on the SLAM map; detecting, by a SLAM positioning device, a loss probability of the mobile vehicle between a first timestamp and a second timestamp; determining whether a condition is satisfied; and updating the SLAM map to a new SLAM map corresponding to a current time point and updating positioning information of the mobile vehicle in the new SLAM map when the condition is satisfied at the current time point.

16 Claims, 5 Drawing Sheets

(51) Int. Cl.
    *G05D 1/02*     (2020.01)
    *G01C 21/32*     (2006.01)

(56) References Cited

OTHER PUBLICATIONS

Song et al., "UWB/LiDAR Fusion for Cooperative Range-Only SLAM", 2019 International Conference on Robotics and Automation (ICRA), Montreal, QC, Canada. May 20-24, 2019, Proceedings of ICRA, pp. 6568-6574, doi: 10.1109/ICRA.2019.8794222.

\* cited by examiner

METHOD FOR RELOCATING A MOBILE VEHICLE IN A SLAM MAP AND MOBILE VEHICLE

CROSS REFERENCE TO RELATED APPLICATIONS

This application claims priority from Taiwan Patent Application No. 109115019, filed on May 6, 2020, the disclosure of which is incorporated herein by reference in its entirety.

BACKGROUND

Technical Field

The present disclosure generally relates to a method for relocating a mobile vehicle and a mobile vehicle. More specifically, aspects of the present disclosure relate to a method for relocating a mobile vehicle in a simultaneous localization and mapping (SLAM) map and a mobile vehicle.

Description of the Related Art

Simultaneous localization and mapping (SLAM) is an accurate and versatile system that enables a mobile robot to map its environment and maintain working data on its position within that map. Its reliability and suitability for a variety of applications make it a useful element for imparting a robot with some level of autonomy.

Currently, SLAM technology uses a method of calculating probability to locate the position of a mobile robot and draw a map. Since the use of this technology requires a more precise position or orientation, once the mobile robot encounters some complex environments or the environment changes greatly, the mobile robot may not be able to relocate itself in the currently drawn SLAM map (i.e., the mobile robot gets lost). The map and positioning information previously created by the mobile robot may also be completely invalid.

Therefore, there is a need for a method for relocating a mobile vehicle in a SLAM map and a mobile vehicle to solve the problems.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method for relocating a mobile vehicle in a SLAM map and a mobile vehicle to overcome the above disadvantages.

In an exemplary embodiment, a method for relocating a mobile vehicle in a simultaneous localization and mapping (SLAM) map, used in the mobile vehicle moving in an area, comprising: using SLAM to establish the SLAM map to the area at an initial time point; detecting, by a non-SLAM positioning device, a first position trajectory and a first azimuth trajectory of the mobile vehicle on the SLAM map; detecting, by a SLAM positioning device, a loss probability of the mobile vehicle between a first timestamp and a second timestamp; determining whether a condition is satisfied; and updating the SLAM map to a new SLAM map corresponding to a current time point and updating positioning information of the mobile vehicle in the new SLAM map when the condition is satisfied at the current time point, wherein the condition is one of the following: the first position trajectory or the first azimuth trajectory is not within a first range and the loss probability is not within a second range; and the loss probability is not within the second range.

In some embodiments, the step of updating the positioning information of the mobile vehicle in the new SLAM map further comprises: using a position and azimuth of the mobile vehicle at the current point to update the SLAM map to the new SLAM map and updating the positioning information, wherein the position and azimuth of the mobile vehicle are detected by the non-SLAM positioning device.

In some embodiments, before the step of updating the positioning information of the mobile vehicle in the new SLAM map, the method further comprises: calculating, by the non-SLAM positioning device, a first trustworthiness value of the mobile vehicle at the current time point; calculating, by the SLAM positioning device, a second trustworthiness value of the mobile vehicle at the current time point; and updating the SLAM map to the new SLAM map corresponding to the current time point and updating the positioning information of the mobile vehicle in the new SLAM map when the first trustworthiness value or the second trustworthiness value is greater than a threshold value.

In some embodiments, the first trustworthiness value and the second trustworthiness value are mean functions.

In some embodiments, the loss probability is a second position trajectory, a second azimuth trajectory along which the vehicle moves between the first time stamp and the second time stamp, or a superimposed difference between the SLAM map at the first time stamp and the SLAM map at the second time stamp.

In some embodiments, the loss probability is a mean function.

In some embodiments, the SLAM positioning device instantly updates the SLAM map to the new SLAM map at the current time point.

In some embodiments, the non-SLAM positioning device aperiodically updates the SLAM map to the new SLAM map.

In some embodiments, the first time stamp and the second time stamp are continuous time stamps.

In some embodiments, the first time stamp and the second time stamp are discontinuous time stamps.

In an exemplary embodiment, a mobile vehicle, moving in an area, comprising: a computing device, using SLAM to establish a SLAM map corresponding to the area at an initial time point; a non-SLAM positioning device, connected to the computing device, detecting a first position trajectory and a first azimuth trajectory of the mobile vehicle on the SLAM map; and a SLAM positioning device, connected to the computing device, detecting a loss probability of the mobile vehicle between a first timestamp and a second timestamp: wherein the computing device determines whether a condition is satisfied, and updates the SLAM map to a new SLAM map corresponding to a current time point and updating positioning information of the mobile vehicle in the new SLAM map when the condition is satisfied at the current time point; wherein the condition is one of the following: the first position trajectory or the first azimuth trajectory is not within a first range and the loss probability is not within a second range; and the loss probability is not within the second range.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

The present disclosure provides a method for relocating a mobile vehicle in a simultaneous localization and mapping (SLAM) map and a mobile vehicle, which adds another precise non-SLAM positioning device to further solve the problem of invalid positioning using the SLAM positioning device.

Figure 1:
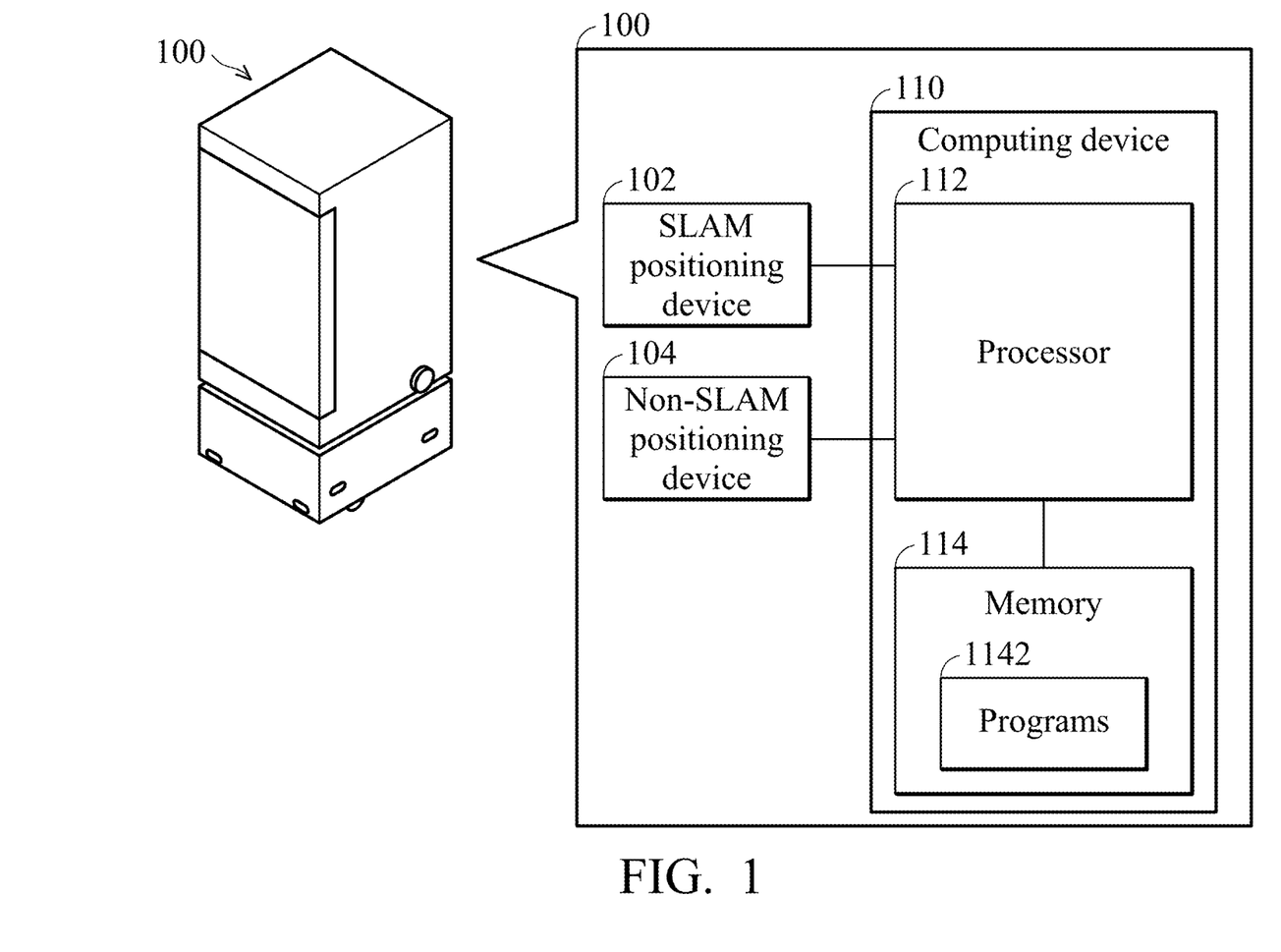
FIG. 1 shows schematically a mobile vehicle in the form of an unmanned vehicle equipment equipped with a SLAM positioning device and a non-SLAM positioning device.

FIG. 1 shows schematically a mobile vehicle 100 in the form of an unmanned vehicle equipment equipped with a SLAM positioning device 102 and a non-SLAM positioning device 104. In the illustrated embodiment, the SLAM positioning device 102 may be any suitable ranging sensor (such as a laser (LiDAR), a laser scanner or a sonar device) that may generate an accurate map. The non-SLAM positioning device 104 may be any radio frequency (RF) based positioning device (for example, ultra-wideband (UWB), Bluetooth, LoRa, Wi-Fi, etc.). The mobile vehicle 100 further comprises a computing device 110 having a processor 112 and a memory 114 capable of storing programs 1142.

The computing device 110 is a device that may support various wireless access technologies, such as a mobile phone, a notebook computer, a smart phone, a tablet computer and so on. The computing device 110 communicates with the SLAM positioning device 102 and the non-SLAM positioning device 104 (for example, via a wireless communication interface), and may store and process data related to signals received by the SLAM positioning device 102 and the non-SLAM positioning device 104.

The memory 114 may store a SLAM map corresponding to an area created by the processor 112 using SLAM. The computing device 110 may further comprise other conventional features, such as a user interface and a communications interface that allows it to exchange data with remote devices. In alternative embodiments, signals from at least one of the sensors may be transferred to a remote computing device for processing rather than being processed by the computing device 110.

In use, the mobile vehicle 100 travels along the road in an area, and the SLAM positioning device 102 and the non-SLAM positioning device 104 capture data related to the scene around the mobile vehicle 100. Although the exemplary mobile vehicle 100 is an unmanned vehicle traveling along a road/ground, it will be appreciated that in alternative embodiments, the mobile vehicle 100 could be any type of device that may be travelling above (and not necessarily in contact with) the ground that can be scanned. Furthermore, in other embodiments, the SLAM positioning device 102, the non-SLAM positioning device 104, and the computing device 110 may not need to be fitted to/on the mobile vehicle 100, but may be included in, for example, a hand-held navigation device.

Figure 2:
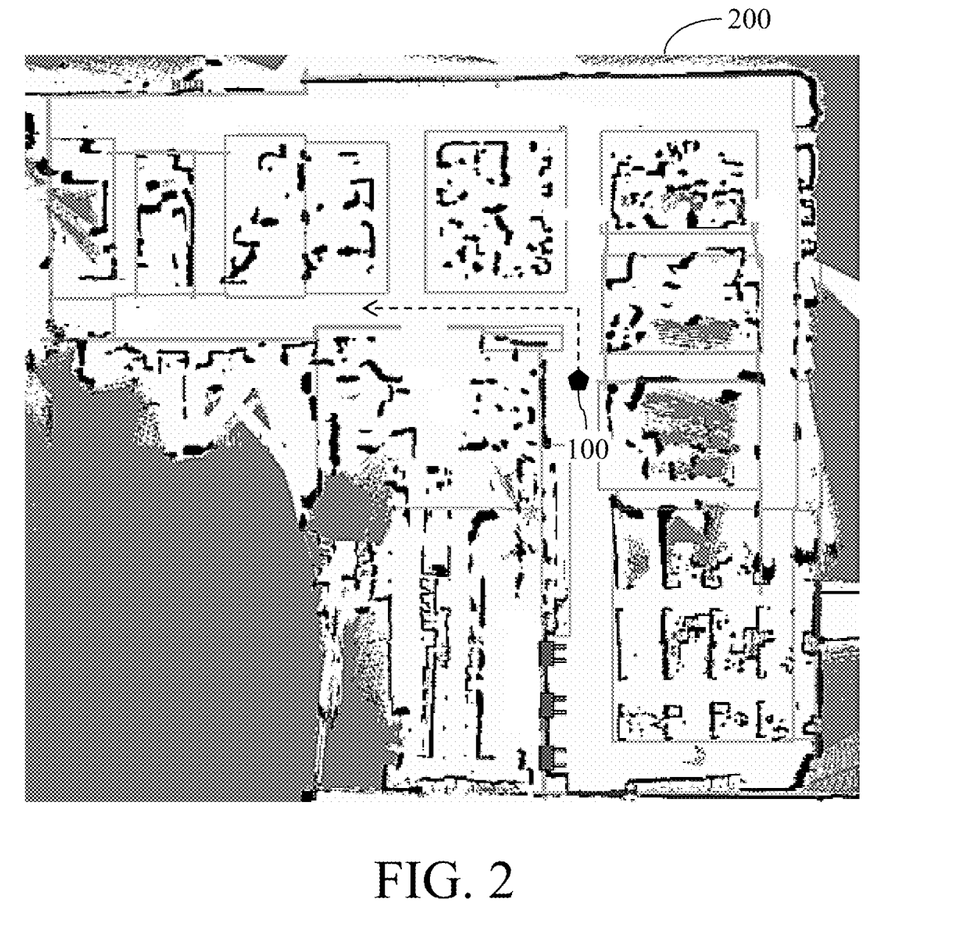
FIG. 2 shows a SLAM map generated by the mobile vehicle according to the data obtained by the SLAM positioning device in accordance with to an embodiment of the disclosure.

The processor 112 is configured to process data received from the SLAM positioning device 102 and the non-SLAM positioning device 104 to try to locate the mobile vehicle 100 from existing map data. The processor 112 may use the data obtained from the SLAM positioning device 102 to generate a SLAM map when the mobile vehicle 100 is running, as shown in FIG. 2. FIG. 2 shows a SLAM map 200 generated by the mobile vehicle 100 according to the data obtained by the SLAM positioning device 102 in accordance with to an embodiment of the disclosure. As shown in the FIG. 2, the SLAM map 200 is composed of at least three data −1, 0, and 1, wherein −1 represents an unknown area (for example, the gray area in FIG. 2), 0 represents a known area (for example, the black area in FIG. 2, wall or obstacle), and 1 represents an empty area (for example, the white area in FIG. 2 or an open space).

It should be understood that the computing device 110 shown in FIG. 1 may be implemented via any type of electronic device, such as the computing device 500 described with reference to FIG. 5, for example.

Figure 3:
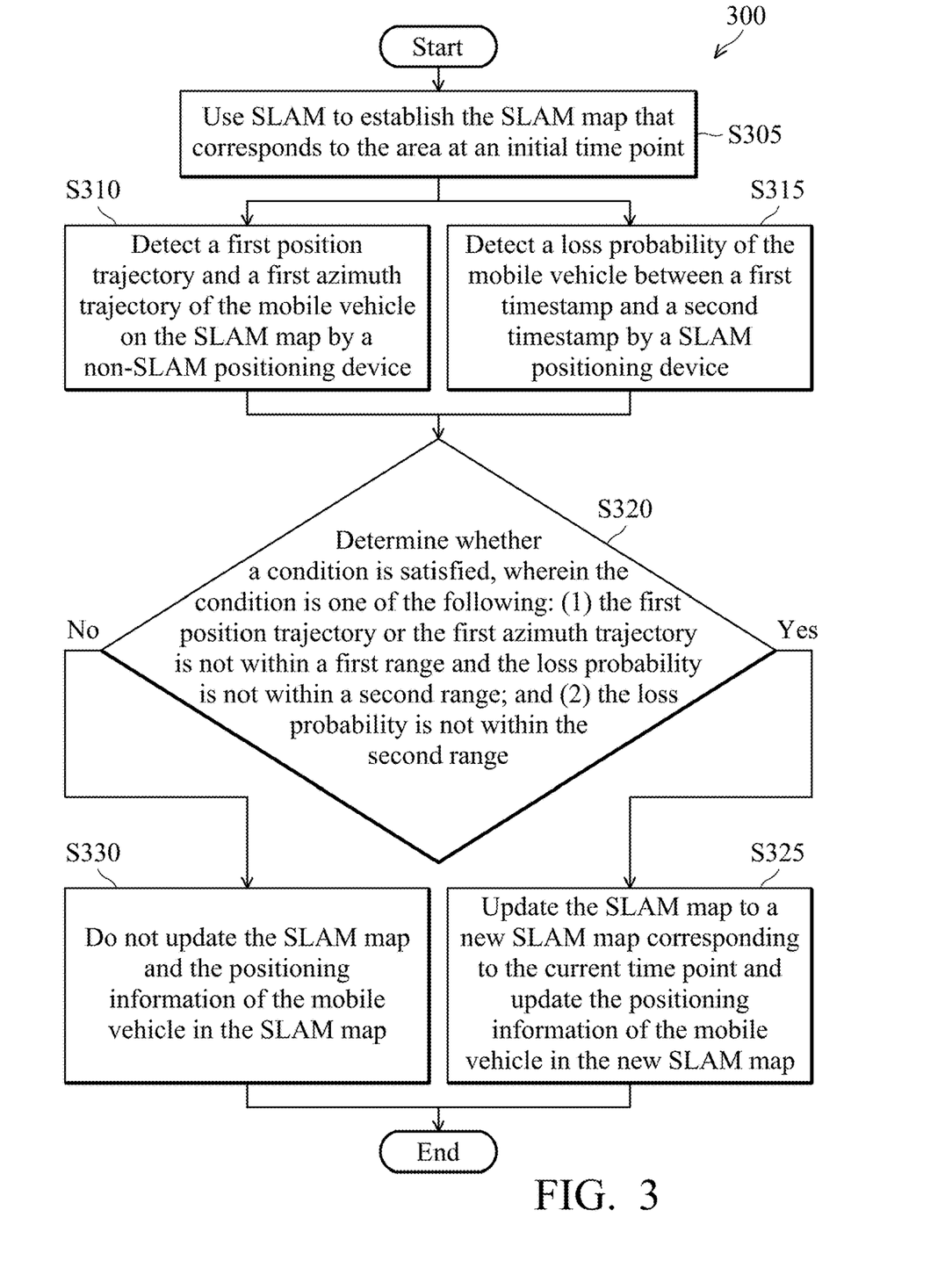
FIG. 3 is a flowchart illustrating a method for relocating a mobile vehicle in a simultaneous localization and mapping (SLAM) map according to an embodiment of the disclosure.

FIG. 3 is a flowchart 300 illustrating a method for relocating a mobile vehicle in a simultaneous localization and mapping (SLAM) map according to an embodiment of the disclosure. This method may be performed in the mobile vehicle 100 moving in an area as shown in FIG. 1.

In step S305, the mobile vehicle uses SLAM to establish the SLAM map that corresponds to the area at an initial time point.

In step S310, the mobile vehicle detects a first position trajectory and a first azimuth trajectory of the mobile vehicle on the SLAM map by a non-SLAM positioning device. Specifically, the non-SLAM positioning device can instantly record the position and azimuth of the mobile vehicle on the SLAM map. All positions can be expressed as a position set rf.p={{timestamp1, position1}, {timestamp2, position2}, . . . }, and all azimuths can be expressed as an azimuth set rf.a={{timestamp1, azrimuth1}, {timestamp2, azrimuth2}, . . . }. The first position trajectory is a trajectory formed by two or more consecutive positions in the position set, and the first azimuth trajectory is a trajectory formed by two consecutive azimuths in the azimuth set.

In step S315, the mobile vehicle detects a loss probability of the mobile vehicle between a first timestamp and a second timestamp by a SLAM positioning device, wherein the loss probability is a second position trajectory, a second azimuth trajectory along which the vehicle moves between the first time stamp and the second time stamp, or a superimposed difference between the SLAM map at the first time stamp and the SLAM map at the second time stamp.

Figure 4:
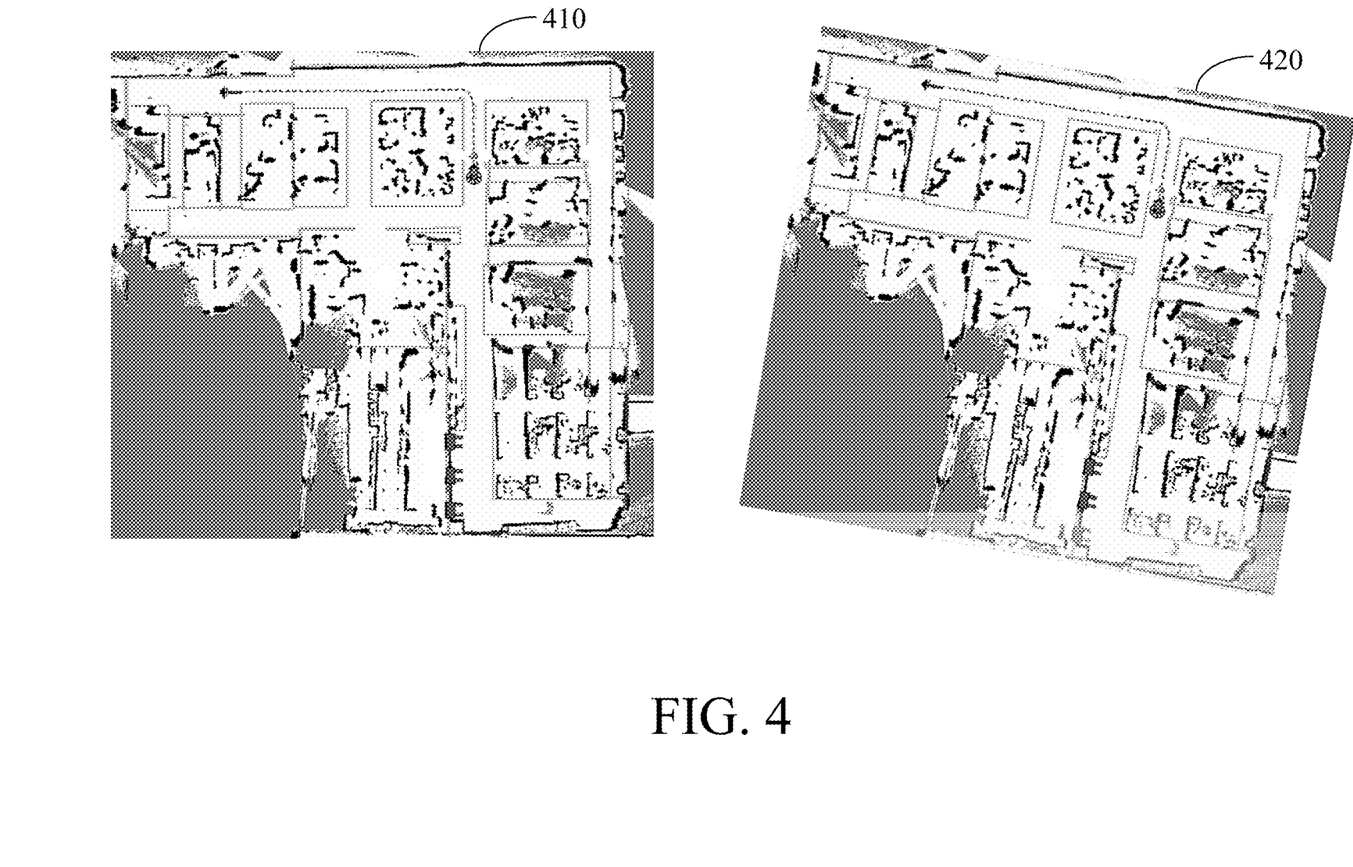
FIG. 4 is a schematic diagram illustrating the overlay of the SLAM maps according to an embodiment of the present disclosure.

Specifically, the SLAM positioning device may instantly record the position and azimuth of the mobile vehicle on the SLAM map. All positions can be expressed as a position set opt.p={{timestamp1, position1}, {timestamp2, position2}, . . . }, and all positions can be expressed as an azimuth set opt.a={{timestamp1, azrimuth1}, {timestamp2, azrimuth2}, . . . }. The second position trajectory is a trajectory formed by two consecutive or any two positions in the position set, and the first azimuth trajectory is a trajectory formed by two consecutive or any two azimuths in the azimuth set. In addition, a superimposed difference between the SLAM map at the first time stamp and the SLAM map at the second time stamp is a difference probability value of the SLAM map between the first time stamp and the second time stamp. For example, FIG. 4 is a schematic diagram illustrating the overlay of the SLAM maps according to an embodiment of the present disclosure. The SLAM map 410 is the SLAM map generated at the time stamp t0, and the SLAM map 420 is the SLAM map generated at the time stamp ti. The SLAM positioning device may calculate the probability values of the SLAM map 410 and the SLAM map 420 as a loss probability of the mobile vehicle between the time stamp t0 and the time stamp ti.

In S315 of FIG. 3, the flow of the mobile vehicle detects the loss probability of the mobile vehicle lost between the first time stamp and the second time stamp by use the SLAM positioning device can be represented by the following python code, wherein the input parameters comprise at least the SLAM map at the previous time t−1 map_t−1, the input of the ranging sensor, LiDAR, (i.e., the distance between the mobile vehicle and the surrounding environment), and the location of the mobile vehicle opt_p_t(x_t, y_t) and the azimuth of the mobile vehicle opt_a_t(a_t) at time t, and "#" and the text on the right indicate the comment in the program.

p=[0.5 for i in range(360)] #initial hypothesis probability
   for i in range(360):
     #At time t, the position and azimuth of the mobile vehicle is opt_p_t (x_t, y_t) and opt_a_t(a_t)
     #bias_i=i*pi/180
     #At time t, all probabilities i estimate the custom function of the map
     p[i]=map(x_t+LiDAR[i]*cos(a_t+bias_i), y_t+LiDAR[i]*sin(a_t+bias_i))

In another embodiment, the loss probability is a mean function, such as mean(p).

In addition, it should be noted that steps S310 and S315 are simultaneously executed by the non-SLAM positioning device and the SLAM positioning device, respectively.

Next, in step S320, the processor of the mobile vehicle determines whether a condition is satisfied, wherein the condition is one of the following: (1) the first position trajectory or the first azimuth trajectory is not within a first range and the loss probability is not within a second range; and (2) the loss probability is not within the second range.

When the condition is satisfied at a current time point ("Yes" in step S320), in step S325, the processor of the mobile vehicle updates the SLAM map to a new SLAM map corresponding to the current time point and updates the positioning information (for example, the position and azimuth) of the mobile vehicle in the new SLAM map. Specifically, the processor of the mobile vehicle uses a position and azimuth of the mobile vehicle at the current time point detected by the non-SLAM positioning device to update the SLAM map to the new SLAM map and updates the positioning information. For example, the position and azimuth of the mobile vehicle on the SLAM map detected by the SLAM positioning device of the mobile vehicle at the current time point i are opt_p_i (x_i, y_i) and opt_a_i(a_i), respectively, and the position and azimuth of the mobile vehicle on the SLAM map detected by the non-SLAM positioning device of the mobile vehicle at the current time point i are rf_p_i (x_i, y_i) and rf_a_i (a_i), respectively. When the condition is satisfied at the current time point i, the processor of the mobile vehicle may update the position and azimuth of the mobile vehicle detected by the SLAM positioning device on the SLAM map from opt_p_i (x_i, y_i) and opt_a_i(a_i) to rf_p_i (x_i, y_i) and rf_a_i(a_i). The SLAM positioning device then updates the SLAM map to a new SLAM map corresponding to the current time point i according to the position and azimuth of the mobile vehicle on the SLAM map rf_p_i (x_i, y_i) and rf_a_i(a_i). After the SLAM positioning device updates the old SLAM map to the new SLAM map, the non-SLAM positioning device may aperiodically update the old SLAM map to the new SLAM map.

When the condition is not satisfied at a current time point ("No" in step S320), in step S330, the processor of the mobile vehicle does not update the SLAM map and the positioning information (for example, the position and azimuth) of the mobile vehicle in the SLAM map.

In another embodiment, in step S325, before updating the SLAM map to the new SLAM map and updating the positioning information, the mobile vehicle may further calculate a first trustworthiness value of the mobile vehicle at the current time point by the non-SLAM positioning device, and calculate a second trustworthiness value of the mobile vehicle at the current time point by the SLAM positioning device. The trustworthiness value indicates whether the result of relocation is trustworthy.

When the first trustworthiness value or the second trustworthiness value is greater than a threshold value, the mobile vehicle updates the SLAM map to the new SLAM map corresponding to the current time point and updates the positioning information of the mobile vehicle in the new SLAM map. When the first trustworthiness value or the second trustworthiness value is not greater than the threshold value, the mobile vehicle does not update the SLAM map and the positioning information of the mobile vehicle.

Specifically, the first trustworthiness value and the second trustworthiness value can be represented by the following python code, wherein the input parameters comprise at least the location of the mobile vehicle opt_p_t(x_t, y_t) and the azimuth of the mobile vehicle opt_a_t(a_t) obtained by the SLAM positioning device at time t, or the location of the mobile vehicle rf_p_t(x_t, y_t) and the azimuth of the mobile vehicle rf_a_t(a_t) obtained by the non-SLAM positioning device at time t, and "#" and the text on the right indicate the comment in the program.

p=[0.5 for i in range(360)] #initial hypothesis probability
for i in range(360):
    #At time t, the position and azimuth of the mobile vehicle is rf_p_t (x_t, y_t) and rf_a_t(a_t), or opt_p_t (x_t, y_t) and opt_a_t(a_t)
    #bias_i=i*pi/180
    #At time t, all probabilities i estimate the custom function of the map
    p[i]=map(x_t+LiDAR[i]*cos(a_t+bias_i), y_t+LiDAR[i]*sin(a_t+bias_i))

In another embodiment, the first trustworthiness value and the second trustworthiness value are mean functions.

In addition, the processor 112 in the mobile vehicle 100 may also be integrated with the SLAM positioning device 102 and the non-SLAM positioning device 104. The processor 112 in the mobile vehicle 100 may also execute the program 1142 in the memory 114 to present the actions and steps described in the above embodiments, or other descriptions in the specification.

Therefore, through using the method of relocating a mobile vehicle in a SLAM map and the mobile vehicle provided in the present disclosure, the SLAM positioning device of the mobile vehicle may relocate itself on the currently drawn SLAM map according to the position and azimuth provided by another accurate non-SLAM positioning device to improve the accuracy of locating in the SLAM map.

Having described embodiments of the present disclosure, an exemplary operating environment in which embodiments of the present disclosure may be implemented is described below. Referring to FIG. 5, an exemplary operating environment for implementing embodiments of the present disclosure is shown and generally known as a computing device 500. The computing device 500 is merely an example of a suitable computing environment and is not intended to limit the scope of use or functionality of the disclosure. Neither should the computing device 500 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

Figure 5:
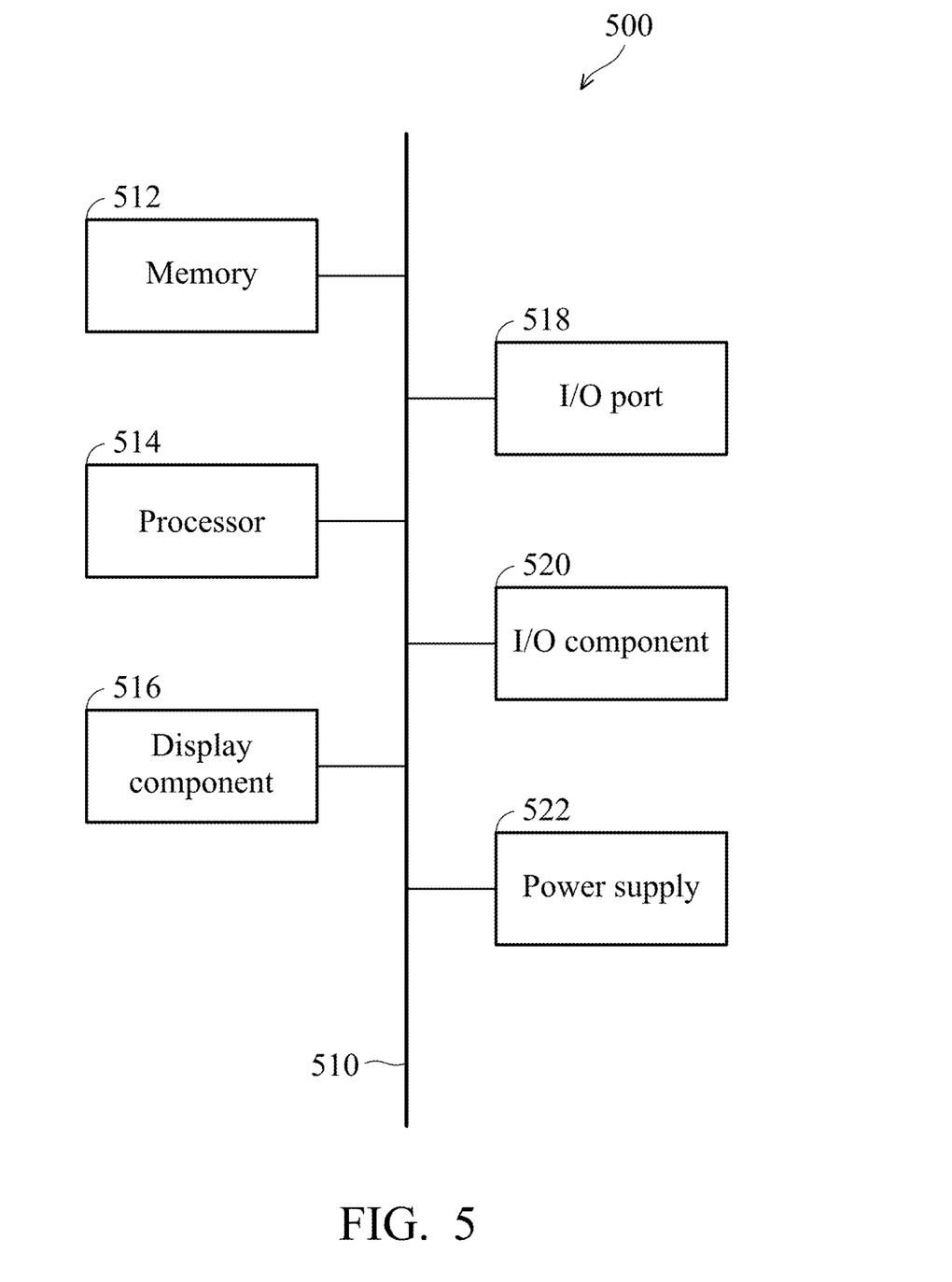
FIG. 5 illustrates an exemplary operating environment for implementing embodiments of the present disclosure.

With reference to FIG. 5, the computing device 500 may include a bus 510 that is directly or indirectly coupled to the following devices: one or more memories 512, one or more processors 514, one or more display components 516, one or more input/output (I/O) ports 518, one or more input/output components 520, and an illustrative power supply 522. The bus 510 may represent one or more kinds of busses (such as an address bus, data bus, or any combination thereof). Although the various blocks of FIG. 5 are shown with lines for the sake of clarity, and in reality, the boundaries of the various components are not specific. For example, the display component such as a display device may be considered an I/O component and the processor may include a memory.

The computing device 500 typically includes a variety of computer-readable media. The computer-readable media can be any available media that can be accessed by the computing device 500 and includes both volatile and non-volatile media, removable and non-removable media. By way of example, not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the computing device 500. The computer storage media may not comprise signals per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 512 may include computer-storage media in the form of volatile and/or nonvolatile memory. The memory may be removable, non-removable, or a combination thereof. Exemplary hardware devices include solid-state memory, hard drives, optical-disc drives, etc. The computing device 500 includes one or more processors that read data from various entities such as the memory 512 or the I/O components 520. The display component(s) 516 present data indications to a user or to another device. Exemplary presentation components include a display device, speaker, printing component, vibrating component, etc.

The I/O ports 518 allow the computing device 500 to be logically coupled to other devices including the I/O components 520, some of which may be embedded. Illustrative components include a microphone, joystick, game pad, satellite dish, scanner, printer, wireless device, etc. The I/O components 520 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the computing device 500, or any combination thereof. The computing device 50000 may be equipped with depth cameras, such as stereoscopic camera systems, infrared camera systems, RGB camera systems, or any combination thereof, to realize gesture detection and recognition. Furthermore, the computing device 500 may be equipped with accelerometers or gyroscopes that enable detection of motion. The output of the accelerometers or gyroscopes may be provided to the display of the computing device 500 to carry out immersive augmented reality or virtual reality.

Furthermore, the processor 514 in the computing device 500 can execute the program code in the memory 512 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for relocating a mobile vehicle in a simultaneous localization and mapping (SLAM) map, for use in the mobile vehicle moving in an area, comprising:
   using SLAM to establish the SLAM map to the area at an initial time point;
   storing the SLAM map in a memory of the mobile vehicle;
   detecting, by a non-SLAM positioning device, a first position trajectory and a first azimuth trajectory of the mobile vehicle on the SLAM map;
   detecting and calculating, by a SLAM positioning device and a processor, a difference probability value between the SLAM map at a first time stamp and the SLAM map at a second time stamp as a loss probability of the mobile vehicle between the first time stamp and the second time stamp;
   determining whether a condition is satisfied;
   in response to the condition being satisfied at a current time point, updating, by the processor accessing the memory, the SLAM map stored in the memory to a new SLAM map corresponding to the current time point by using a position and azimuth of the mobile vehicle at the current time point and updating positioning information of the mobile vehicle in the new SLAM map, wherein the position and azimuth of the mobile vehicle are detected by the non-SLAM positioning device,
   wherein the condition is one of the following:
      the first position trajectory or the first azimuth trajectory is not within a first range; and
      the loss probability is not within a second range; and
   relocating and operating the mobile vehicle in the area according to the new SLAM map stored in the memory.

2. The method as claimed in claim 1, wherein before the step of updating the positioning information of the mobile vehicle in the new SLAM map, the method further comprises:
   calculating, by the processor, a first trustworthiness value of the mobile vehicle at the current time point;
   calculating, by the processor, a second trustworthiness value of the mobile vehicle at the current time point; and
   updating the SLAM map to the new SLAM map corresponding to the current time point and updating the positioning information of the mobile vehicle in the new SLAM map when the first trustworthiness value or the second trustworthiness value is greater than a threshold value.

3. The method as claimed in claim 2, wherein the first trustworthiness value and the second trustworthiness value are mean functions.

4. The method as claimed in claim 1, wherein the loss probability is a mean function.

5. The method as claimed in claim 1, wherein the processor instantly updates the SLAM map to the new SLAM map at the current time point.

6. The method as claimed in claim 1, wherein the processor aperiodically updates the SLAM map to the new SLAM map.

7. The method as claimed in claim 1, wherein the first time stamp and the second time stamp are continuous time stamps.

8. The method as claimed in claim 1, wherein the first time stamp and the second time stamp are discontinuous time stamps.

9. A mobile vehicle, moving in an area, comprising:
   a processor of a computing device, using SLAM to establish a SLAM map corresponding to the area at an initial time point and storing the SLAM map in a memory of the mobile vehicle;
   a non-SLAM positioning device, connected to the computing device, detecting a first position trajectory and a first azimuth trajectory of the mobile vehicle on the SLAM map; and
   a SLAM positioning device and a processor, connected to the computing device, detecting and calculating a difference probability value between the SLAM map at a first time stamp and the SLAM map at a second time stamp as a loss probability of the mobile vehicle between the first time stamp and the second time stamp;

wherein in response to a condition being satisfied at a current time point, the computing device updating, by the processor accessing the memory, the SLAM map stored in the memory to a new SLAM map corresponding to the current time point by using a position and azimuth of the mobile vehicle at the current time point and updates the positioning information of the mobile vehicle in the new SLAM map, wherein the position and azimuth of the mobile vehicle are detected by the non-SLAM positioning device;

wherein the condition is one of the following:
the first position trajectory or the first azimuth trajectory is not within a first range; and
the loss probability is not within a second range; and
the computing device relocates and operates the mobile vehicle in the area according to the new SLAM map stored in the memory.

10. The mobile vehicle as claimed in claim 9, wherein before the step of updating the positioning information of the mobile vehicle in the new SLAM map, the mobile vehicle further executes:

the processor calculates a first trustworthiness value of the mobile vehicle at the current time point;

the processor calculates a second trustworthiness value of the mobile vehicle at the current time point; and the processor of the computing device updates the SLAM map to the new SLAM map corresponding to the current time point and updating the positioning information of the mobile vehicle in the new SLAM map when the first trustworthiness value or the second trustworthiness value is greater than a threshold value.

11. The mobile vehicle as claimed in claim 10, wherein the first trustworthiness value and the second trustworthiness value are mean functions.

12. The mobile vehicle as claimed in claim 9, wherein the loss probability is a mean function.

13. The mobile vehicle as claimed in claim 9, wherein the processor instantly updates the SLAM map to the new SLAM map at the current time point.

14. The mobile vehicle as claimed in claim 9, wherein the processor aperiodically updates the SLAM map to the new SLAM map.

15. The mobile vehicle as claimed in claim 9, wherein the first time stamp and the second time stamp are continuous time stamps.

16. The mobile vehicle as claimed in claim 9, wherein the first time stamp and the second time stamp are discontinuous time stamps.

* * * * *